(12) United States Patent
Liu et al.

(10) Patent No.: US 12,517,153 B2
(45) Date of Patent: Jan. 6, 2026

(54) ANALOG QUANTITY ACQUISITION METHOD AND APPARATUS

(71) Applicants: STATE GRID INFORMATION & TELECOMMUNICATIONS GROUP CO., LTD., Beijing (CN); STATE GRID INFO-TELECOM GREAT POWER SCIENCE AND TECHNOLOGY CO., LTD., Fujian (CN); FUJIAN NETPOWER TECHNOLOGY DEVELOPMENT CO., LTD., Fujian (CN)

(72) Inventors: Zhu Liu, Beijing (CN); Wenjing Li, Beijing (CN); Yunpeng Li, Beijing (CN); Yonggui Wang, Beijing (CN); Chuanjian Cui, Fujian (CN); Lvchao Huang, Beijing (CN); Xueyu Han, Beijing (CN); Jinguo Fang, Beijing (CN); Xiao Feng, Beijing (CN); Xiaokang Lin, Fujian (CN); Yuan Gao, Beijing (CN); Shunhui Luo, Fujian (CN); Shuying Cheng, Fujian (CN); Tengfei Dong, Fujian (CN); Chao Zhan, Fujian (CN); Afeng Tan, Fujian (CN)

(73) Assignees: STATE GRID INFORMATION & TELECOMMUNICATIONS GROUP CO., LTD., Beijing (CN); STATE GRID INFO-TELECOM GREAT POWER SCIENCE AND TECHNOLOGY CO., LTD., Xiamen (CN); FUJIAN NETPOWER TECHNOLOGY DEVELOPMENT CO., LTD., Fuzhou (CN)

( * ) Notice: Subject to any disclaimer, the term of this patent is extended or adjusted under 35 U.S.C. 154(b) by 231 days.

(21) Appl. No.: 18/241,998

(22) Filed: Sep. 4, 2023

(65) Prior Publication Data

US 2024/0036080 A1 Feb. 1, 2024

Related U.S. Application Data

(63) Continuation-in-part of application No. PCT/CN2023/087428, filed on Apr. 11, 2023.

(30) Foreign Application Priority Data

May 31, 2022 (CN) .......................... 202210609532.X

(51) Int. Cl.
*G01R 15/18* (2006.01)
*G01R 19/02* (2006.01)
(Continued)

(52) U.S. Cl.
CPC ........... *G01R 15/185* (2013.01); *G01R 19/02* (2013.01); *G01R 35/005* (2013.01); *G01R 19/2509* (2013.01); *G01R 25/00* (2013.01)

(58) Field of Classification Search
CPC  G01R 15/185; G01R 19/2509; G01R 35/005; G01R 19/02; G01R 25/00
(Continued)

(56) References Cited

U.S. PATENT DOCUMENTS

| 2002/0070724 A1* | 6/2002 | Edel ...................... H01F 27/427 324/117 R |
| 2011/0156697 A1* | 6/2011 | Gunn ................... G01R 15/183 324/127 |

(Continued)

FOREIGN PATENT DOCUMENTS

| CN | 205826736 U | 12/2016 |
| CN | 106526287 A | 3/2017 |

(Continued)

OTHER PUBLICATIONS

CN 114284047 Machine Translation, Apr. 5, 2022 (Year: 2022).*
CN 214750535 Machine Translation, Nov. 16, 2021 (Year: 2021).*

*Primary Examiner* — Raul J Rios Russo

(57) ABSTRACT

Disclosed are an analog quantity acquisition method and apparatus. An acquisition circuit with a zero flux current transformer is first used to acquire a current signal, where the acquisition circuit with the zero flux current transformer (Continued)

includes the zero flux current transformer, a compensating winding, and a dynamic detection unit, and the compensating winding generates a reverse excitation potential to counteract an excitation current and eliminate impacts of a ratio error and a phase angle error on accuracy. A multi-segment amplification circuit is used to perform segmented amplification on different ranges of the current signal, and full-range current acquisition is achieved by using different amplification circuits. An analog-to-digital converter chip is used to convert an amplified current signal into a digital signal. The acquisition circuit with the zero flux current transformer is used to eliminate the impacts of the ratio error and the phase angle error on the measurement accuracy.

8 Claims, 6 Drawing Sheets

(51) Int. Cl.
*G01R 19/25* (2006.01)
*G01R 25/00* (2006.01)
*G01R 35/00* (2006.01)

(58) Field of Classification Search
USPC .......................................................... 324/127
See application file for complete search history.

(56) References Cited

U.S. PATENT DOCUMENTS

2013/0229171 A1* 9/2013 Gunn .................... G01R 15/185
324/127
2021/0356529 A1* 11/2021 Zhang .................... G01R 31/40

FOREIGN PATENT DOCUMENTS

| CN | 214750535 U | 11/2021 |
| CN | 114284047 A | 4/2022 |
| JP | H09171935 A | 6/1997 |

* cited by examiner

“ANALOG QUANTITY ACQUISITION METHOD AND APPARATUS

CROSS REFERENCE TO RELATED APPLICATIONS

The present application is a Continuation-In-Part Application of PCT Application No. PCT/CN2023/087428 filed on Apr. 11, 2023, which claims the benefit of Chinese Patent Application No. 202210609532.X filed on May 31, 2022. All the above are hereby incorporated by reference in their entirety.

TECHNICAL FIELD

The present disclosure relates to the technical field of electric energy measurement, and in particular, to an analog quantity acquisition method and apparatus.

BACKGROUND

A settlement and metering apparatus for a substation has technical characteristics such as high accuracy and high reliability. With the further development of the ultra-high voltage technology and digital technology, the settlement and metering apparatus for the substation imposes higher requirements for stability and reliability of analysis on electric quantity accuracy and electric energy quality.

However, in the prior art, a conventional metering and detection apparatus only has a function of metering electric energy. With a large acquisition current, a small dynamic range, and a low accuracy requirement, the conventional metering and detection apparatus cannot meet a requirement for measurement accuracy of a small current.

Therefore, how to design the settlement and metering apparatus for the substation to meet high-precision and full-range requirements of a new-generation settlement and metering apparatus for the substation has become an urgent technical problem to be resolved.

SUMMARY

In view of this, embodiments of the present disclosure provide an analog quantity acquisition method and apparatus to resolve problems of a small current measurement range and a low accuracy of a conventional metering and detection apparatus in the prior art.

According to a first aspect, an embodiment of the present disclosure provides an analog quantity acquisition method, including:
    acquiring a current signal by using an acquisition circuit with a zero flux current transformer;
    performing segmented amplification on different ranges of the current signal by using a multi-segment amplification circuit; and
    converting an amplified current signal into a digital signal by using an analog-to-digital converter chip.
    Optionally, the acquisition circuit with the zero flux current transformer includes the zero flux current transformer, a compensating winding, and a dynamic detection unit; and the acquiring a current signal by using an acquisition circuit with a zero flux current transformer includes:
        generating a reverse excitation potential by using the compensating winding; and
        the dynamic detection unit is configured to detect a potential difference between two ends of the compensating winding, and generate a secondary current, where the secondary current generates a demagnetized magnetic potential to counteract an excitation current, so as to enable the zero flux current transformer to achieve a magnetic potential balance.
    Optionally, the performing segmented amplification on different ranges of the current signal by using a multi-segment amplification circuit specifically includes:
        adjusting a resistance value of the multi-segment amplification circuit to segment a measurement range of the current signal; and
        performing segmented amplification on the current signal.
    Optionally, the adjusting a resistance value of the multi-segment amplification circuit to segment a measurement range of the current signal specifically includes:
        adjusting the resistance value of the multi-segment amplification circuit to divide the measurement range of the current signal into a first current signal measurement segment, a second current signal measurement segment, and a third current signal measurement segment, where
        the first current signal measurement segment ranges from a maximum measurement current to a rated current;
        the second current signal measurement segment includes a breakover current, and the breakover current and the rated current meets a following relationship: the rated current=20*the breakover current; and
        the third current signal measurement segment includes a minimum measurement current.
    Optionally, after the adjusting a resistance value of the multi-segment amplification circuit to segment a measurement range of the current signal, the method further includes:
        setting a calibration point within each measurement segment to calibrate an effective value and a phase of the current signal.
    According to a second aspect, an embodiment of the present disclosure provides an analog quantity acquisition apparatus, including:
        an acquisition module, an amplification module, and a conversion module, where
        the acquisition module is configured to acquire a current signal by using an acquisition circuit with a zero flux current transformer;
        the amplification module is configured to perform segmented amplification on different ranges of the current signal by using a multi-segment amplification circuit; and
        the conversion module is configured to convert an amplified current signal into a digital signal by using an analog-to-digital converter chip.
    Optionally, the acquisition circuit with the zero flux current transformer includes the zero flux current transformer, a compensating winding, and a dynamic detection unit; and the acquisition module is configured to:
        generate a reverse excitation potential by using the compensating winding; and
        the dynamic detection unit is configured to detect a potential difference between two ends of the compensating winding, and generate a secondary current, where the secondary current generates a demagnetized magnetic potential to counteract an excitation current, so as to enable the zero flux current transformer to achieve a magnetic potential balance.
    Optionally, the amplification module is configured to:
        adjust a resistance value of the multi-segment amplification circuit to segment a measurement range of the current signal; and perform segmented amplification on the current signal.

Optionally, the apparatus further includes a segmentation module, and the segmentation module is specifically configured to:

adjust the resistance value of the multi-segment amplification circuit to divide the measurement range of the current signal into a first current signal measurement segment, a second current signal measurement segment, and a third current signal measurement segment, where the first current signal measurement segment ranges from a maximum measurement current to a rated current;

the second current signal measurement segment includes a breakover current, and the breakover current and the rated current meets a following relationship: the rated current=20*the breakover current; and the third current signal measurement segment includes a minimum measurement current.

Optionally, the apparatus further includes a calibration module, and after the resistance value of the multi-segment amplification circuit is adjusted to segment the measurement range of the current signal, the calibration module is specifically configured to:

set a calibration point within each measurement segment to calibrate an effective value and a phase of the current signal.

The embodiments of the present disclosure provide an analog quantity acquisition method and apparatus. When the method is executed, an acquisition circuit with a zero flux current transformer is first used to acquire a current signal, where the acquisition circuit with the zero flux current transformer includes the zero flux current transformer, a compensating winding, and a dynamic detection unit, and the compensating winding generates a reverse excitation potential to counteract an excitation current and eliminate impacts of a ratio error and an phase angle error on accuracy. Then, a multi-segment amplification circuit is used to perform segmented amplification on different ranges of the current signal, and full-range current acquisition is achieved by using different amplification circuits. Finally, an analog-to-digital converter chip is used to convert an amplified current signal into a digital signal. In this way, the acquisition circuit with the zero flux current transformer is used to eliminate the impacts of the ratio error and the phase angle error on the measurement accuracy. The full-range current acquisition is achieved by using different amplification circuits. Therefore, problems of a small current measurement range and a low accuracy of a conventional metering and detection apparatus in the prior art are resolved.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description only show some embodiments of the present disclosure, and a person of ordinary skill in the art may still derive other accompanying drawings from these accompanying drawings without creative efforts.

DETAILED DESCRIPTION

At present, a conventional settlement and metering apparatus for a substation mainly uses a conventional current transformer to acquire a three-phase analog current, with a rated current of 1.5 A, a maximum measurement current of 6 A, a minimum measurement current of 15 mA, and an active power metering accuracy of 0.2%, and uses a metering chip to achieve basic functions such as analog quantity acquisition and electric quantity metering. However, with special requirements of a new-generation substation for high-precision metering and high electric energy quality, the rated current In is equal to 0.3 A, the maximum measurement current Imax is equal to 1.2 A, and the minimum measurement current is equal to 3 mA. For a short-term overcurrent test, it is required to measure 10 Ins, in other words, a current is 3A, with an error deviation limit of 0.05%. Electric energy quality analysis reaches more than 50th order harmonic, and a maximum signal level of the metering chip during normal operation is only ±0.7 Vpp because the metering chip has a fixed sampling number and sampling rate, which cannot meet a requirement for full-range current acquisition. A settlement and metering apparatus that uses the conventional current transformer to acquire a small current and a phase is no longer able to meet its technical requirements. In addition, higher requirements are put forward for safety and reliability of a new-generation settlement and metering apparatus, imposing a higher requirement on design redundancy of the apparatus.

Figure 1:
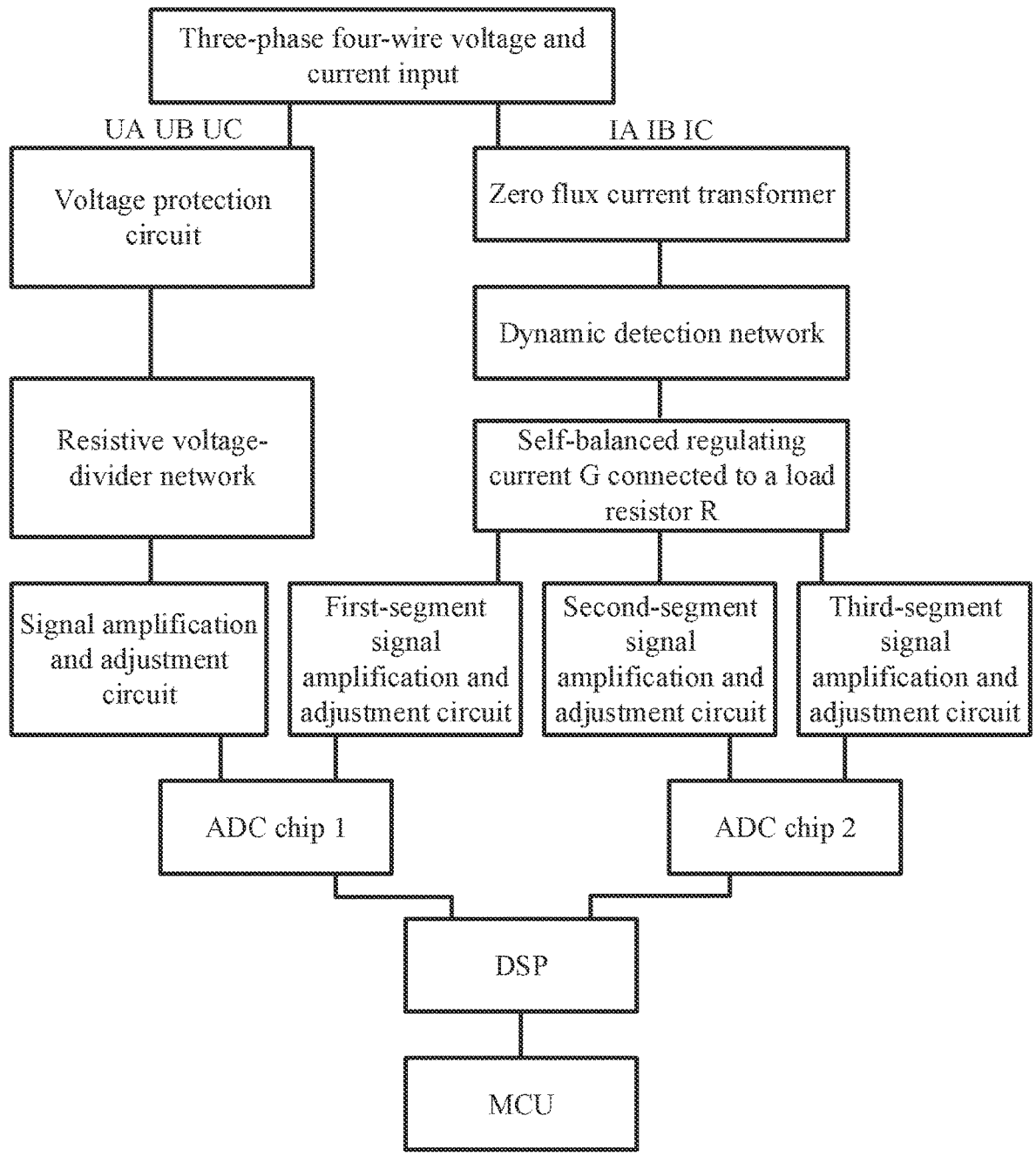
FIG. 1 is a functional design block diagram corresponding to an analog quantity acquisition method according to an embodiment of the present disclosure.

In view of this, the present disclosure provides a design method in which a zero flux current transformer is used to acquire a current, a resistive voltage-divider network is used to acquire a voltage, multi-segment current acquisition is performed by using hardware, and multi-point calibration is conducted by using software. A corresponding functional design block diagram is shown in FIG. 1. A design structure of an analog-to-digital converter (ADC)+a digital signal processor (DSP)+a microcontroller unit (MCU) is adopted. The ADC represents an analog-to-digital converter chip, the DSP represents a digital signal processing chip, and the MCU represents a single-chip microcomputer. The high-precision ADC acquires raw voltage and current waveforms, and the DSP processes data acquired by the ADC, and calibrates an effective value and a phase of the acquired data through Fourier transform and the like. Data such as active power, reactive power, apparent power, a power factor, and effective voltage and current values is compensated and calculated to meet requirements for high-precision and full-range analog quantity acquisition of a small current.

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present application without creative efforts shall fall within the protection scope of the present application.

Figure 2:
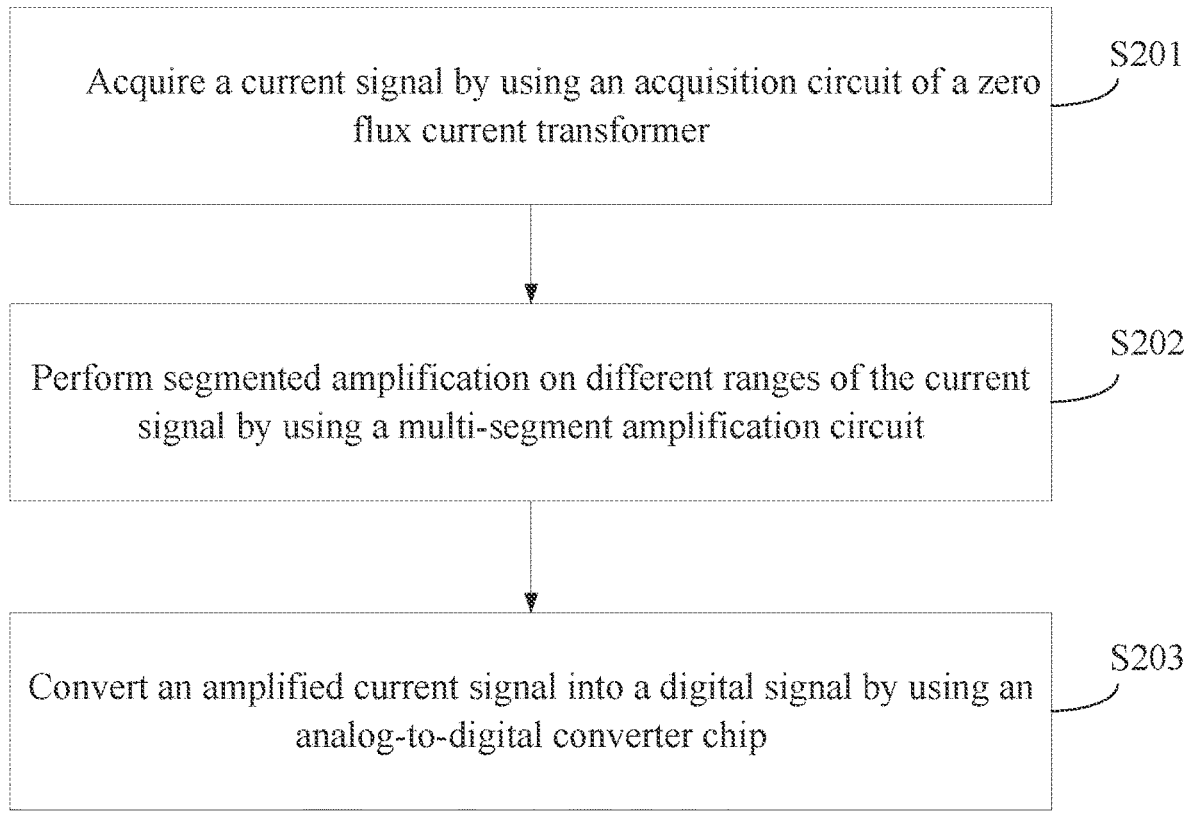
FIG. 2 is a flowchart of an analog quantity acquisition method according to an embodiment of the present disclosure.

FIG. 2 is a flowchart of an analog quantity acquisition method according to an embodiment of the present disclosure. The analog quantity acquisition method includes following steps.

S201: Acquire a current signal by using an acquisition circuit with a zero flux current transformer, where the acquisition circuit with the zero flux current transformer includes the zero flux current transformer CT1A, a compensating winding $n_2$, and a dynamic detection unit D.

Figure 3:
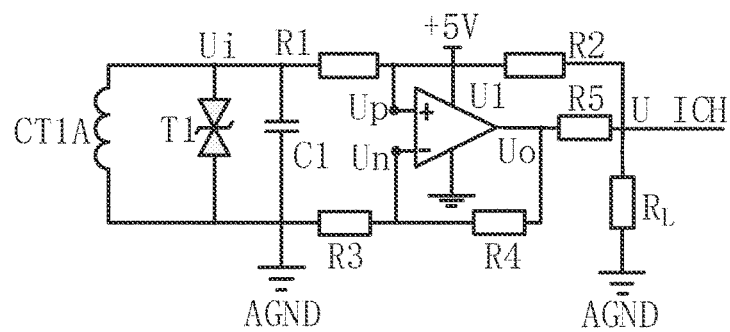
FIG. 3 is a circuit diagram of an acquisition circuit with a zero flux current transformer according to an embodiment of the present disclosure.
Figure 4:
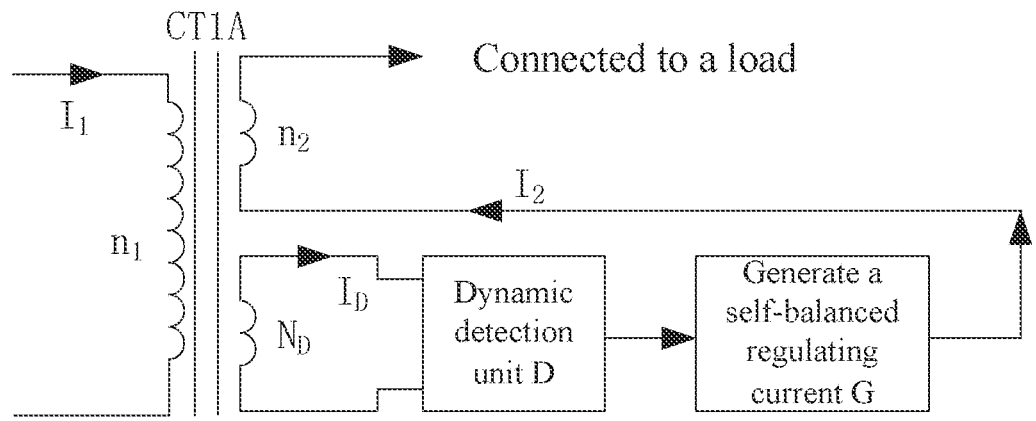
FIG. 4 is a design block diagram of an acquisition circuit with a zero flux current transformer according to an embodiment of the present disclosure.
Figure 5:
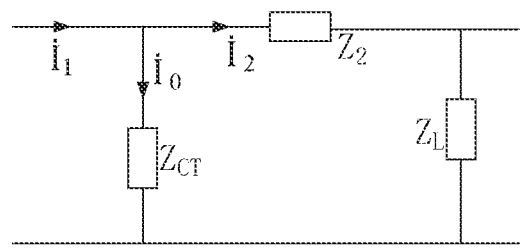
FIG. 5 is an equivalent diagram of a secondary circuit of a zero flux current transformer according to an embodiment of the present disclosure.

FIG. 3 is a circuit diagram of the acquisition circuit with the zero flux current transformer according to an embodiment of the present disclosure. FIG. 4 is a design block diagram of the acquisition circuit with the zero flux current transformer according to an embodiment of the present disclosure. FIG. 5 is an equivalent diagram of a secondary circuit of the zero flux current transformer according to an embodiment of the present disclosure.

In FIG. 5, $\dot{I}_1$ represents a current on a primary side of the current transformer, $\dot{I}_2$ represents a current on a secondary side of the current transformer, $\dot{I}_0$ represents an excitation current, $Z_{CT}$ represents impedance of the current transformer, $Z_2$ represents impedance on the secondary side of the current transformer, $Z_L$ represents load impedance, and $N_1$ and $N_2$ respectively represent the number of turns of a primary winding and the number of turns of a secondary winding.

A magnetic potential equation of the current transformer is as follows:

$$\dot{I}_1 N_1 + \dot{I}_2 N_2 = -\dot{I}_0 N_1.$$

An error of the current transformer is calculated according to a following formula:

$$\varepsilon = -\dot{I}_0 N_1 / \dot{I}_1 N_1 = f + j\delta.$$

In the above formula, f and δ respectively represent a ratio error and a phase angle error of the transformer, and j represents an imaginary unit in a complex number. Therefore, it can be seen that when the excitation current $\dot{I}_0$ is zero, an ampere-turn change on the secondary side can fully reflect an ampere-turn change on the primary side.

Referring to FIG. 3 and FIG. 4, the zero flux current transformer CT1A includes a primary winding n1 and a measurement winding $N_D$. Referring to FIG. 3, the dynamic detection unit D includes a first operational amplifier U1, a first capacitor C1, a first resistor R1, a second resistor R2, a third resistor R3, a fourth resistor R4, and a fifth resistor R5. A first terminal of the measurement winding $N_D$ is connected to a non-inverting input terminal of the first operational amplifier U1 through the first resistor R1, a second terminal of the measurement winding $N_D$ is connected to an inverting input terminal of the first operational amplifier U1 through the third resistor R3, and the first terminal of the measurement winding $N_D$ is also grounded through the first capacitor C1. The non-inverting input terminal of the first operational amplifier U1 is connected to a first terminal of a load resistor $R_L$ through the second resistor R2, and a second terminal of the load resistor $R_L$ is grounded. The inverting input terminal of the first operational amplifier U1 is grounded through the third resistor R3. The inverting input terminal of the first operational amplifier U1 is connected to an output terminal of the first operational amplifier U1 through the fourth resistor R4, the output terminal of the first operational amplifier U1 is connected to a first terminal of the fifth resistor R5, and a second terminal of the fifth resistor R5 is grounded through the load resistor $R_L$. A voltage at the second terminal of the fifth resistor R5 is U_ICH.

In addition, to protect the circuit, a TVS transistor T1 may also be disposed, which is connected in parallel to the measurement winding $N_D$.

As shown in FIG. 3 and FIG. 4, an excitation magnetic flux generated by a current $I_1$ of the primary winding n1 of the zero flux current transformer CT1A generates an induced potential on the two terminals of the measurement winding $N_D$, and the induced potential is applied to the dynamic detection unit D. The dynamic detection unit D generates a self-balanced regulating current G (in other words, an active network generates the dynamic current $\dot{I}_2$), and the $\dot{I}_2$ generates a demagnetized magnetic potential to demagnetize an iron core, enabling the iron core to reach a magnetic potential balance. In an ideal state, the $\dot{I}_2$ is fully supplied by the active network, without taking a current from the induced potential. The dynamic detection unit D is mainly responsible for dynamically tracking a potential difference between the two terminals of the $N_D$. When the potential difference is small enough, the iron core is in a zero magnetic flux state. The $\dot{I}_2$ becomes an AC voltage U_ICH after passing through the load resistor $R_L$, and then the AC voltage U_ICH enters an ADC after being amplified by a high-precision operational amplifier at a rear end. In this way, the iron core can always maintain a state of approaching a zero magnetic flux, ensuring that the zero flux current transformer also has high accuracy in small current range.

The circuit in FIG. 3 is used to convert the induced potential into a compensating current, and corresponding calculation formulas are as follows:

$$\frac{Ui - Up}{R1} = \frac{Up - \text{U\_ICH}}{R2}$$

$$\frac{Un}{R3} = \frac{Uo - Un}{R4}$$

In the above formulas, Up and Un respectively represent a non-inverting input voltage and an inverting input voltage of the first operational amplifier U1, which are equal based on a "false short circuit" of the operational amplifier:

$$Up = Un$$

Assuming that R1=R3=R2=R4, it can be obtained that:

$$Up = 0.5*(Ui + U\_ICH)$$

$$Un = 0.5*Uo$$

It can be obtained that:

$$Ui = U\_ICH - Uo$$

$$IL = \frac{Ui}{R5}$$

In the above formulas, IL represents the current $I_2$ on the secondary side of the zero flux current transformer. When an effective value and a phase of a small current are inaccurately measured, the zero flux current transformer is used as a current acquisition element. Compared with a conventional transformer, the zero flux current transformer has small errors of the ratio error and the phase angle error. In order to eliminate an impact of the excitation current on measurement accuracy, the zero flux current transformer uses one compensating winding $n_2$ to generate a reverse excitation potential to counteract the excitation current $I_0$. In this way, the measurement winding $N_D$ is not affected by the excitation current, and there is no ratio error and phase angle error. Therefore, high-accuracy measurement can also be achieved within the small current range.

S202: Perform segmented amplification on different ranges of the current signal by using a multi-segment amplification circuit.

Figure 6:
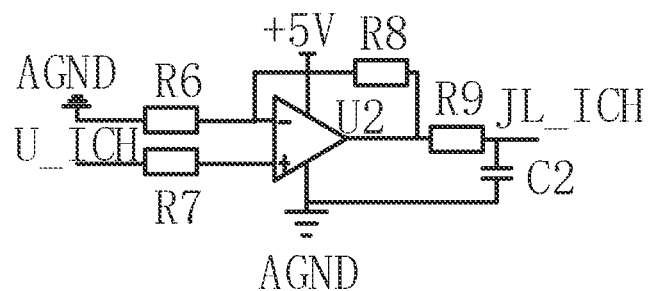
FIG. 6 is a schematic diagram of a current amplification circuit according to an embodiment of the present disclosure.

The acquisition circuit with the zero flux current transformer is connected to the multi-segment amplification circuit. The multi-segment amplification circuit may be a three-segment, four-segment, or five-segment amplification circuit. Certainly, a quantity of amplification circuits may be set based on an actual usage requirement. In specific implementation, a current measurement range can be adjusted based on actual needs. For example, for full-range detection of 0.003 A to 3 A currents, three-segment acquisition is used in hardware, and different amplification circuits are used to achieve full-range current acquisition. A specific design circuit is shown in FIG. 6. The second terminal of the fifth resistor R5 is connected to an amplification circuit of each segment. For example, the amplification circuit of each segment includes a second operational amplifier U2, a second capacitor C2, a sixth resistor R6, a seventh resistor R7, an eighth resistor R8, and a ninth resistor R9. The second terminal of the fifth resistor R5 is connected to a non-inverting input terminal of the second operational amplifier U2 through the seventh resistor R7. An inverting input terminal of the second operational amplifier U2 is grounded through the sixth resistor R6. The inverting input terminal of the second operational amplifier U2 is connected to an output terminal of the second operational amplifier U2 through the eighth resistor R8. The output terminal of the second operational amplifier U2 is connected to a first terminal of the second capacitor C2 through the ninth resistor R9, and a second terminal of the second capacitor C2 is grounded.

Following formulas are used:

$$U\_ICH = IL * RL$$

$$JL\_ICH = (1 + \frac{R8}{R6}) * U\_ICH$$

In the above formulas, JL_ICH represents a voltage value of the current signal that enters an analog-to-digital converter chip after passing through the amplification circuit. It can be seen that in a design of the three-segment acquisition circuit, the current measurement range is segmented in the hardware by adjusting different resistance values of the R6 and the R8. A first current signal measurement segment ranges from a maximum measurement current Imax to a rated current In. A second current signal measurement segment includes a breakover current Itr (where the In and the Itr meet a following relationship: In=20 Itr). A third current signal measurement segment includes a minimum measurement current Imin (where the Imin and the Itr meets a following relationship: Imin=⅕ Itr).

S203: Convert an amplified current signal into a digital signal by using the analog-to-digital converter chip.

Acquisition accuracy of a settlement and metering apparatus for a substation mainly depends on accuracy of original voltage and current values. Voltage analog quantity acquisition mainly uses a high-precision and low-temperature drift resistor for voltage division. A acquired voltage is amplified by a high-precision operational amplifier, and then converted from an analog quantity into a digital quantity by using the analog-to-digital converter chip (ADC chip). The current is acquired mainly by using a transformer. In the design, the zero flux current transformer is used to acquire the current. In order to fully acquire a plurality of segments of current signals, a data acquisition system using a plurality of 16-bit high-precision, high-speed, low-power, charge-redistribution successive approximation ADCs is adopted. The data acquisition system can synchronously sample eight analog input channels, and the data acquisition system can process±5 V true bipolar input signals.

An ADC chip 1 acquires a three-phase voltage signal processed by a voltage front-end acquisition circuit, and a first-segment three-phase current signal JL_ICH1 processed by a first-segment current amplification circuit in the current front-end acquisition circuit. An ADC chip 2 acquires a second-segment three-phase current signal JL_ICH2 and a third-segment three-segment current signal JL_ICH3 that are respectively processed by second-segment and third-segment current amplification circuits in the current front-end acquisition circuit. The first-segment current amplification circuit is a non-inverting proportional amplifying circuit without phase flipping Amplified current signals of the three segments are gradually reduced based on a designed amplification factor. The current amplification circuit is composed of a non-inverting proportional amplifying circuit and an RC filtering circuit, which improves a load capacity and filters out high-frequency noise.

In order to make full use of high dynamic resolution of the ADC chip, peak-to-peak values of voltages and currents in different ranges can be amplified to around ±4.7 V, to achieve full-range high-precision measurement. A DSP can simultaneously acquire data from a plurality of ADC chips. The ADC chip 1 selects six channels, with the first three channels carrying three-phase voltage signals and the last three channels carrying current signals ($I_1$). The ADC chip 2 selects six channels that carry small current signals ($I_2$ and $I_D$), with each channel carrying a signal of 2 bytes, representing an instantaneous value of a digital signal converted from a current or voltage analog signal. An MCU reads, through a serial peripheral interface (SPI), data processed by the DSP, saves and converts the data, divides voltage and current values by channel, obtains voltage and current waveform data, and calculates parameters such as active, reactive, and apparent power.

The embodiments of the present disclosure provide an analog quantity acquisition method and apparatus. When the method is executed, an acquisition circuit with a zero flux current transformer is first used to acquire a current signal, where the acquisition circuit with the zero flux current transformer includes the zero flux current transformer CT1A, a compensating winding $n_2$, and a dynamic detection unit D, and the compensating winding $n_2$ generates a reverse excitation potential to counteract an excitation current and eliminate impacts of a ratio error and a phase angle error on accuracy. The dynamic detection unit D detects a potential difference between two terminals of the compensating winding $n_2$, and generates a secondary current that is converted into a voltage signal after passing through a load resistance $R_L$. Then, a multi-segment amplification circuit is used to perform segmented amplification on different ranges of the current signal, and full-range current acquisition is achieved by using different amplification circuits. Finally, an analog-to-digital converter chip is used to convert an amplified current signal into a digital signal. In this way, the acquisition circuit with the zero flux current transformer is used to eliminate the impacts of the ratio error and the phase angle error on the measurement accuracy. The full-range current acquisition is achieved by using different amplification circuits. Therefore, problems of a small current measurement range and a low accuracy of a conventional metering and detection apparatus in the prior art are resolved.

In an optional embodiment of the present disclosure, after the current signal measurement range is segmented by adjusting resistance value of the multi-segment amplification circuit, a calibration point can also be set within each measurement segment to calibrate an effective value and a phase of the current signal, to ensure that the current can maintain good linearity within each measurement range. The high-precision ADC chip can achieve high-precision synchronous signal acquisition within a segmented dynamic range, to ensure that both large and small currents can be at reasonable positions of an input range of the high-precision ADC chip, thereby ensuring that both the large and small currents can be accurately measured.

Figure 7:
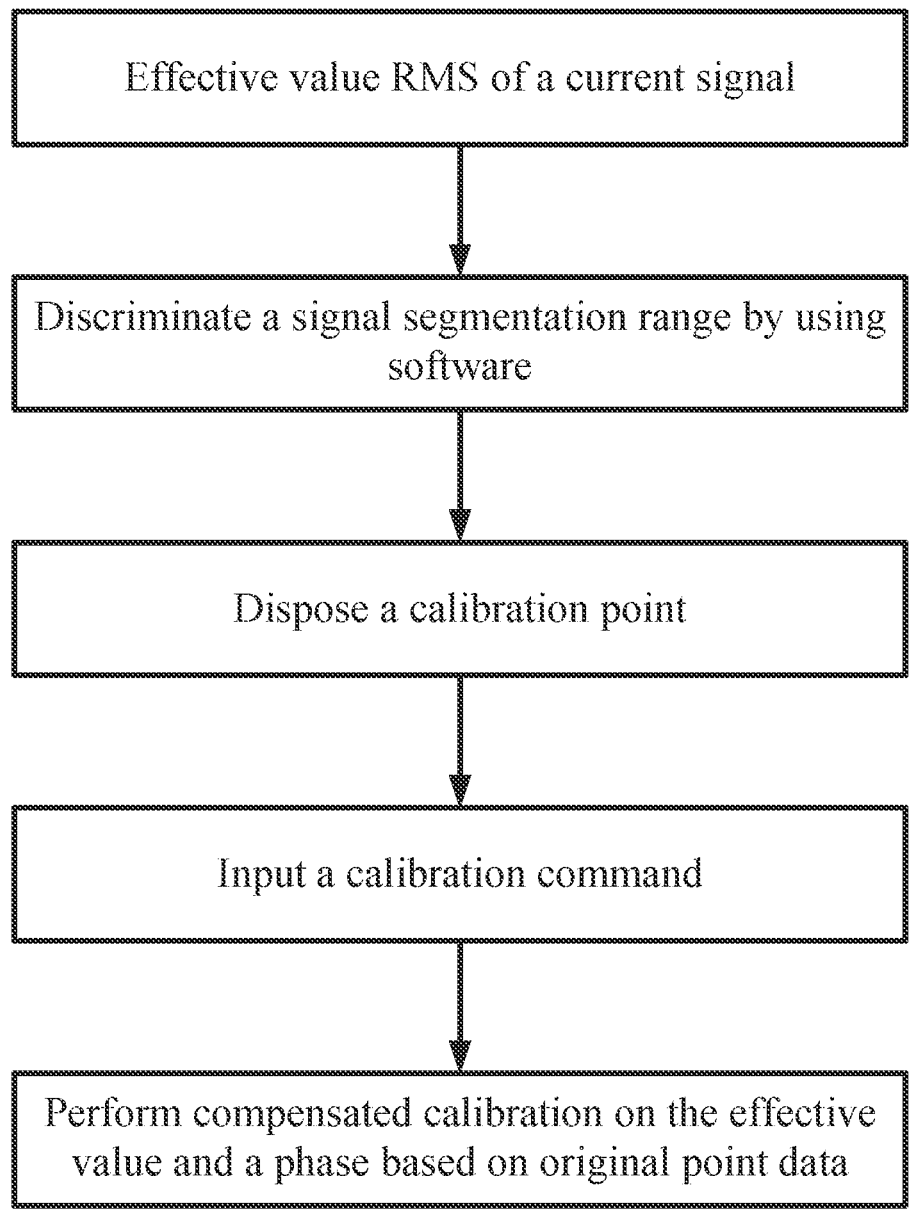
FIG. 7 is a flowchart of a method for calibrating an effective value and a phase of a current signal according to an embodiment of the present disclosure.

For measurement of current analog signals within a large dynamic range, the dynamic range is decomposed into three small dynamic ranges through hardware segmentation. Then, the ADC chip and software are used to select three signals and determine a current signal range based on a value of read data, so as to select a corresponding signal as a current signal to be actually processed. Two calibration points are disposed within each segment to ensure that the current can maintain the good linearity within each measurement range. The high-precision ADC chip can achieve the high-precision synchronous signal acquisition within the segmented dynamic range, to ensure that both the large and small currents can be at the reasonable positions of the input range of the high-precision ADC chip, thereby ensuring that both the large and small currents can be accurately measured. A specific process is shown in FIG. 7.

Assuming that the current measurement range is ($I_a$, $I_b$), two calibration points $I_3$ and $I_4$ are taken.

$$I_3 = I_a + \frac{1}{3}(I_b - I_a) = \frac{2}{3}I_a + \frac{1}{3}I_b$$

$$I_4 = I_a + \frac{2}{3}(I_b - I_a) = \frac{1}{3}I_a + \frac{2}{3}I_b$$

At each calibration point, the current is measured for 60 times, and an average value is taken.

$$I_3' = \frac{\sum_{i=1}^{60} I_{3i}}{60}, I_4' = \frac{\sum_{i=1}^{60} I_{4i}}{60}$$

Calibration coefficients k and b of the effective value meet following formulas:

$$I_3 = kI_3' + b$$

$$I_4 = kI_4' + b$$

Similarly, at the two calibration points within each measurement segment, phase calibration is performed when a phase angle between the voltage and the current is 60°, in other words, when a power factor is 0.5 L. Based on original point waveform data, an angle deviation is recorded twice to obtain phase calibration coefficients k' and b'. The k, the b, the k', and the b' are written into a calibration register to calibrate the effective value and the phase.

The ADC chip performs sampling at a fixed frequency to obtain measurement data of the three signals, and solve effective values for the measurement data of the three signals separately. When the current signal is input, the three effective values obtained are RMS1, RMS2, and RMS3, where RMS1<RMS2<RMS3. When the small signal is input, a measured value of the RMS3 is within a normal range, while measured values of the RMS1 and the RMS2 are less than a minimum threshold. When the large signal is input, the measured value of the RMS1 is within the normal range, while measured values of the RMS2 and the RMS3 exceed a maximum threshold. In this case, the RMS1, the RMS2, and the RMS3 are compared to select a signal for next processing, thereby achieving high-precision synchronous sampling of multi-channel analog signals with the large dynamic range.

The above are some specific implementations of the analog quantity acquisition method provided in the embodiments of the present disclosure. Based on this, the present disclosure further provides a corresponding apparatus. Next, the apparatus provided in the embodiments of the present disclosure is described below from a perspective of functional modularity.

Figure 8:
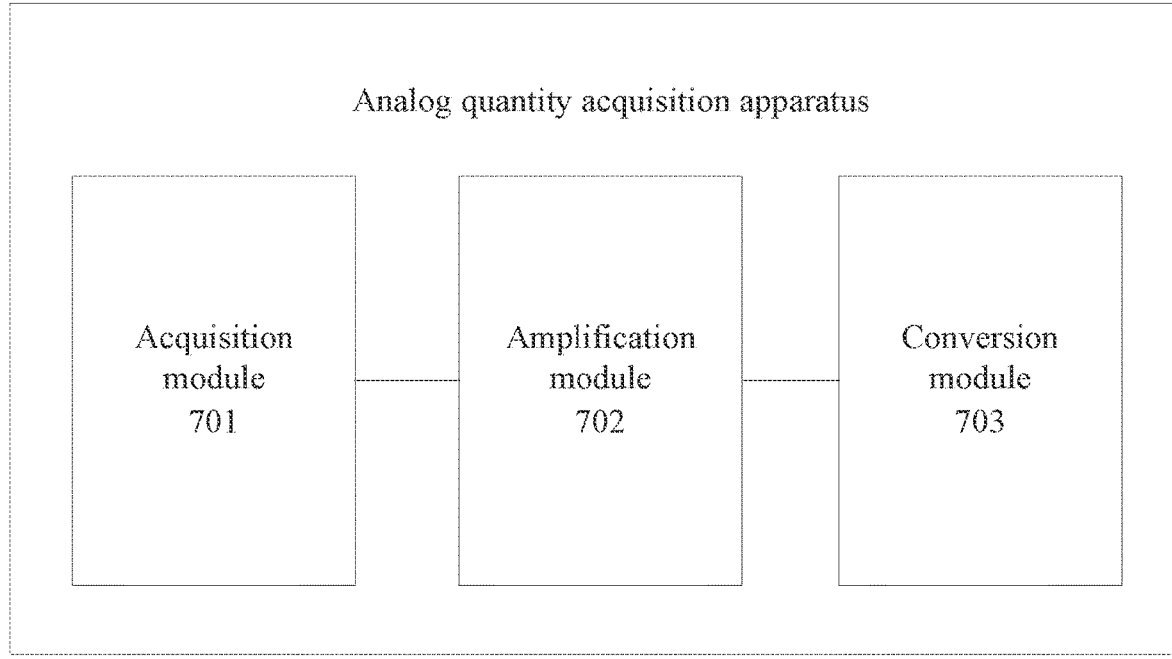
FIG. 8 is a schematic structural diagram of an analog quantity acquisition apparatus according to an embodiment of the present disclosure.

Referring to FIG. 8, FIG. 8 is a schematic structural diagram of an analog quantity acquisition apparatus according to an embodiment of the present disclosure. The apparatus includes an acquisition module 701, an amplification module 702, and a conversion module 703.

The acquisition module 701 is configured to acquire a current signal by using an acquisition circuit with a zero flux current transformer, where the acquisition circuit with the zero flux current transformer includes the zero flux current transformer CT1A, a compensating winding $n_2$, and a dynamic detection unit D.

The amplification module 702 is configured to perform segmented amplification on different ranges of the current signal by using a multi-segment amplification circuit.

The conversion module 703 is configured to convert an amplified current signal into a digital signal by using an analog-to-digital converter chip.

In an optional embodiment of the present disclosure, the acquisition module 701 is configured to:
generate a reverse excitation potential by using the compensating winding $n_2$; and
the dynamic detection unit D is configured to detect a potential difference between two ends of the compensating winding $n_2$, and generate a secondary current, where the secondary current generates a demagnetized magnetic potential to counteract an excitation current, so as to enable the zero flux current transformer CT1A to achieve a magnetic potential balance.

In an optional embodiment of the present disclosure, the amplification module 702 is configured to:

adjust a resistance value of the multi-segment amplification circuit to segment a measurement range of the current signal; and perform segmented amplification on the current signal.

Figure 9:
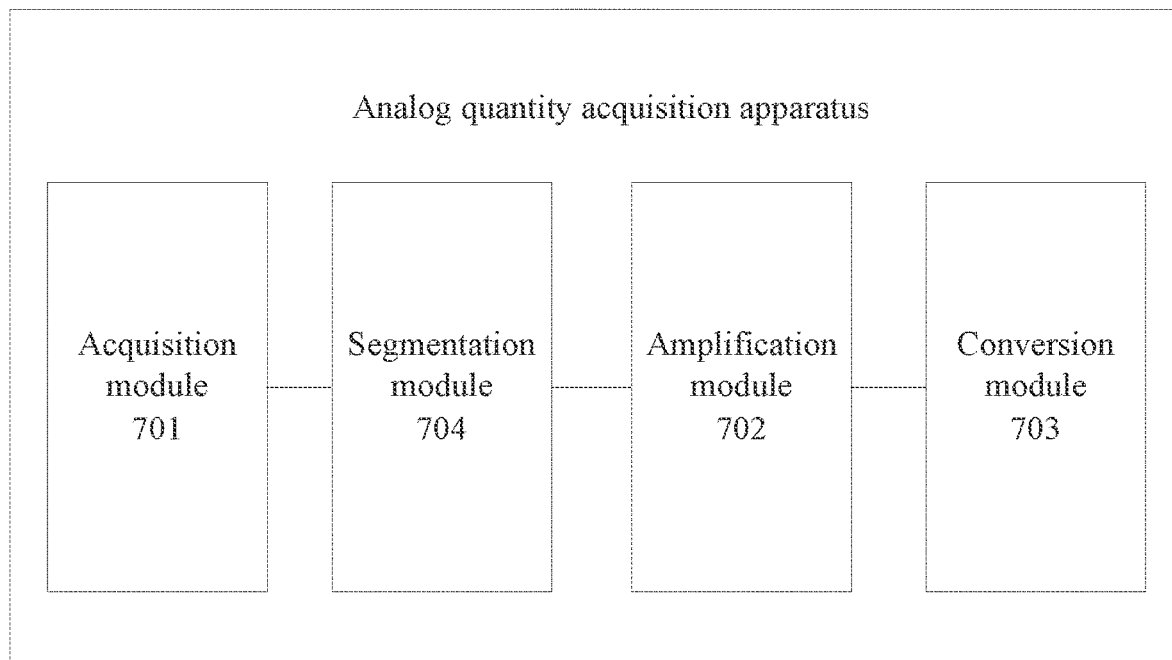
FIG. 9 is a schematic structural diagram of another analog quantity acquisition apparatus according to an embodiment of the present disclosure.

Referring to FIG. 9, FIG. 9 is a schematic structural diagram of another analog quantity acquisition apparatus according to an embodiment of the present disclosure. The apparatus further includes a segmentation module 704. The segmentation module 704 is specifically configured:

adjust the resistance value of the multi-segment amplification circuit to divide the measurement range of the current signal into a first current signal measurement segment, a second current signal measurement segment, and a third current signal measurement segment, where the first current signal measurement segment ranges from a maximum measurement current to a rated current;

the second current signal measurement segment includes a breakover current, and the breakover current and the rated current meets a following relationship: the rated current=20*the breakover current; and the third current signal measurement segment includes a minimum measurement current.

Figure 10:
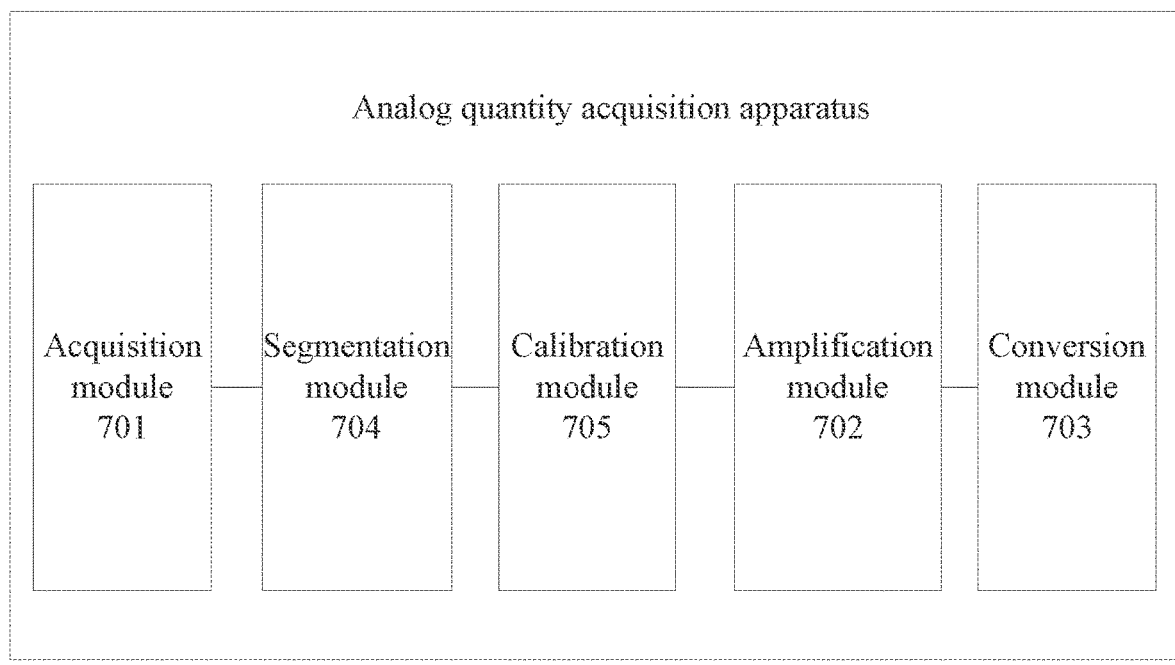
FIG. 10 is a schematic structural diagram of still another analog quantity acquisition apparatus according to an embodiment of the present disclosure.

Referring to FIG. 10, FIG. 10 is a schematic structural diagram of still another analog quantity acquisition apparatus according to an embodiment of the present disclosure. The apparatus further includes a calibration module 705. The calibration module 705 is specifically configured to:

after the resistance value of the multi-segment amplification circuit is adjusted to segment the measurement range of the current signal, set a calibration point within each measurement segment to calibrate an effective value and a phase of the current signal.

In the embodiments of the present disclosure, the acquisition module 701, the amplification module 702, the conversion module 703, the segmentation module 704, and the calibration module 705 each may be one or more processors, controllers or chips that each have a communication interface, can realize a communication protocol, and may further include a memory, a related interface and system transmission bus, and the like if necessary. The processor, controller or chip executes program-related code to realize a corresponding function. In an alternative solution, the acquisition module 701, the amplification module 702, the conversion module 703, the segmentation module 704, and the calibration module 705 share an integrated chip or share devices such as a processor, a controller, and a memory. The shared processor, controller or chip executes program-related code to implement a corresponding function.

The terms "first," "second," and "third" mentioned in the embodiments of the present disclosure are only used for name identification and do not indicate a specific sequence.

The embodiments in this specification are described in a progressive manner. For same or similar parts between embodiments, reference may be made to each other. Each embodiment focuses on a difference from other embodiments. Especially, for an apparatus embodiment, since it is basically similar to the method embodiment, the description is relatively simple, and reference can be made to the description of the method embodiment. Some or all of the modules may be selected based on actual needs to achieve the objectives of the solutions of the embodiments. Those of ordinary skill in the art can understand and implement the embodiments without creative effort.

The foregoing description is merely the implementations of the present disclosure, and is not intended to limit the protection scope of present disclosure.

The invention claimed is:

1. An analog quantity acquisition method, comprising:

acquiring a current signal by using an acquisition circuit with a zero flux current transformer;

performing segmented amplification on different ranges of the current signal by using a multi-segment amplification circuit; and converting an amplified current signal into a digital signal by using an analog-to-digital converter chip;

wherein the acquisition circuit with the zero flux current transformer comprises the zero flux current transformer, a compensating winding, and a dynamic detection unit; and the acquiring a current signal by using an acquisition circuit with a zero flux current transformer comprises:

generating a reverse excitation potential by using the compensating winding; and the dynamic detection unit is configured to detect a potential difference between two ends of the compensating winding, and generate a secondary current, wherein the secondary current generates a demagnetized magnetic potential to counteract an excitation current, so as to enable the zero flux current transformer to achieve a magnetic potential balance;

wherein the zero flux current transformer comprises a primary winding and a measurement winding; the dynamic detection unit comprises a first operational amplifier, a first capacitor, a first resistor, a second resistor, a third resistor, a fourth resistor, and a fifth resistor; a first terminal of the measurement winding is connected to a non-inverting input terminal of the first operational amplifier through the first resistor, a second terminal of the measurement winding is connected to an inverting input terminal of the first operational amplifier through the third resistor, and the first terminal of the measurement winding is also grounded through the first capacitor; the non-inverting input terminal of the first operational amplifier is connected to a first terminal of a load resistor through the second resistor, and a second terminal of the load resistor is grounded; the inverting input terminal of the first operational amplifier is grounded through the third resistor; the inverting input terminal of the first operational amplifier is connected to an output terminal of the first operational amplifier through the fourth resistor, the output terminal of the first operational amplifier is connected to a first terminal of the fifth resistor, and a second terminal of the fifth resistor is grounded through the load resistor;

wherein the multi-segment amplification circuit comprises a plurality of amplification circuits, the second terminal of the fifth resistor is connected to each of the amplification circuits; each of the amplification circuits comprises a second operational amplifier, a second capacitor, a sixth resistor, a seventh resistor, an eighth resistor, and a ninth resistor; the second terminal of the fifth resistor is connected to a non-inverting input terminal of the second operational amplifier through the seventh resistor; an inverting input terminal of the second operational amplifier is grounded through the sixth resistor; the inverting input terminal of the second operational amplifier is connected to an output terminal of the second operational amplifier through the eighth resistor; the output terminal of the second operational amplifier is connected to a first terminal of the second capacitor through the ninth resistor, and a second terminal of the second capacitor is grounded.

2. The method according to claim 1, wherein the performing segmented amplification on different ranges of the current signal by using a multi-segment amplification circuit specifically comprises:
   adjusting a resistance value of the multi-segment amplification circuit to segment a measurement range of the current signal; and
   performing segmented amplification on the current signal.

3. The method according to claim 2, wherein the adjusting a resistance value of the multi-segment amplification circuit to segment a measurement range of the current signal specifically comprises:
   adjusting the resistance value of the multi-segment amplification circuit to divide the measurement range of the current signal into a first current signal measurement segment, a second current signal measurement segment, and a third current signal measurement segment, wherein
   the first current signal measurement segment ranges from a maximum measurement current to a rated current;
   the second current signal measurement segment comprises a breakover current, and the breakover current and the rated current meets a following relationship: the rated current=20*the breakover current; and
   the third current signal measurement segment comprises a minimum measurement current.

4. The method according to claim 2, after the adjusting a resistance value of the multi-segment amplification circuit to segment a measurement range of the current signal, further comprising:
   setting a calibration point within each measurement segment to calibrate an effective value and a phase of the current signal.

5. An analog quantity acquisition apparatus, wherein the apparatus comprises a memory and a processor configured to execute programming modules stored in the memory, wherein the programming modules comprise an acquisition module, an amplification module, and a conversion module;
   the acquisition module is configured to acquire a current signal by using an acquisition circuit with a zero flux current transformer;
   the amplification module is configured to perform segmented amplification on different ranges of the current signal by using a multi-segment amplification circuit; and
   the conversion module is configured to convert an amplified current signal into a digital signal by using an analog-to-digital converter chip;
   wherein the acquisition circuit with the zero flux current transformer comprises the zero flux current transformer, a compensating winding, and a dynamic detection unit; and the acquisition module is configured to:
   generate a reverse excitation potential by using the compensating winding; and
   the dynamic detection unit is configured to detect a potential difference between two ends of the compensating winding, and generate a secondary current, wherein the secondary current generates a demagnetized magnetic potential to counteract an excitation current, so as to enable the zero flux current transformer to achieve a magnetic potential balance;
   wherein the zero flux current transformer comprises a primary winding and a measurement winding; the dynamic detection unit comprises a first operational amplifier, a first capacitor, a first resistor, a second resistor, a third resistor, a fourth resistor, and a fifth resistor; a first terminal of the measurement winding is connected to a non-inverting input terminal of the first operational amplifier through the first resistor, a second terminal of the measurement winding is connected to an inverting input terminal of the first operational amplifier through the third resistor, and the first terminal of the measurement winding is also grounded through the first capacitor; the non-inverting input terminal of the first operational amplifier is connected to a first terminal of a load resistor through the second resistor, and a second terminal of the load resistor is grounded; the inverting input terminal of the first operational amplifier is grounded through the third resistor; the inverting input terminal of the first operational amplifier is connected to an output terminal of the first operational amplifier through the fourth resistor, the output terminal of the first operational amplifier is connected to a first terminal of the fifth resistor, and a second terminal of the fifth resistor is grounded through the load resistor;
   wherein the multi-segment amplification circuit comprises a plurality of amplification circuits, the second terminal of the fifth resistor is connected to each of the amplification circuits; each of the amplification circuits comprises a second operational amplifier, a second capacitor, a sixth resistor, a seventh resistor, an eighth resistor, and a ninth resistor; the second terminal of the fifth resistor is connected to a non-inverting input terminal of the second operational amplifier through the seventh resistor; an inverting input terminal of the second operational amplifier is grounded through the sixth resistor; the inverting input terminal of the second operational amplifier is connected to an output terminal of the second operational amplifier through the eighth resistor; the output terminal of the second operational amplifier is connected to a first terminal of the second capacitor through the ninth resistor, and a second terminal of the second capacitor is grounded.

6. The apparatus according to claim 5, wherein the amplification module is configured to:
   adjust a resistance value of the multi-segment amplification circuit to segment a measurement range of the current signal; and
   perform segmented amplification on the current signal.

7. The apparatus according to claim 6, wherein the apparatus further includes a segmentation module, the processor is further configured to execute the segmentation module stored in the memory, and the segmentation module is specifically configured to:
   adjust the resistance value of the multi-segment amplification circuit to divide the measurement range of the current signal into a first current signal measurement segment, a second current signal measurement segment, and a third current signal measurement segment, wherein
   the first current signal measurement segment ranges from a maximum measurement current to a rated current;
   the second current signal measurement segment comprises a breakover current, and the breakover current and the rated current meets a following relationship: the rated current=20*the breakover current; and
   the third current signal measurement segment includes a minimum measurement current.

8. The apparatus according to claim 6, wherein the apparatus further comprises a calibration module, the processor is further configured to execute the calibration module stored in the memory, and after the resistance value of the multi-segment amplification circuit is adjusted to segment the measurement range of the current signal, the calibration module is specifically configured to:

set a calibration point within each measurement segment to calibrate an effective value and a phase of the current signal.

* * * * *